United States Patent
Kulshreshtha et al.

(10) Patent No.: US 12,443,574 B1
(45) Date of Patent: Oct. 14, 2025

(54) SYSTEMS AND METHODS FOR DYNAMIC EVALUATION OF METADATA CONSISTENCY AND DATA RELIABILITY

(71) Applicant: Capital One Services, LLC, McLean, VA (US)

(72) Inventors: Shitij Kulshreshtha, Glen Allen, VA (US); Rama Mohan Boppana, Glen Allen, VA (US); Sean Murray, McLean, VA (US); Jared W. McDaniel, McLean, VA (US); Rahul Babu Mummaneni, McLean, VA (US); Andrew Seaton, McLean, VA (US); Rachel Rogers, McLean, VA (US); Sudeesh Madhusudanan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/633,389

(22) Filed: Apr. 11, 2024

(51) Int. Cl.
G06F 16/215 (2019.01)
G06F 16/11 (2019.01)
G06F 16/23 (2019.01)

(52) U.S. Cl.
CPC .......... *G06F 16/215* (2019.01); *G06F 16/125* (2019.01); *G06F 16/2379* (2019.01)

(58) Field of Classification Search
CPC ... G06F 16/215; G06F 16/125; G06F 16/2379
See application file for complete search history.

(56) References Cited

U.S. PATENT DOCUMENTS 10,127,264 B1 * 11/2018 Pyle .................. G06F 16/2365

* cited by examiner

*Primary Examiner* — Jay A Morrison
(74) *Attorney, Agent, or Firm* — Foley & Lardner LLP

(57) ABSTRACT

Systems and methods for dynamically evaluating metadata consistency and data reliability in a data management system are disclosed herein. The system may retrieve first metadata and second metadata. The system may retrieve a metadata ruleset. Based on the metadata ruleset, the system may generate a first metadata consistency metric indicating a first measure of consistency. The system may determine to process each record of the first metadata as a batch. The system may generate a second metadata consistency metric indicating a second measure of consistency. The system may determine to process each record of the second metadata independently.

20 Claims, 6 Drawing Sheets

100

| Metadata | |
|---|---|
| Attribute 102a | Value 102b |
| Metadata Identifier 104 | 29349 |
| Data Type 106 | User Information |
| Region Identifier 108 | British Columbia, Canada |
| Log File Location 110 | Filepath A |
| Associated Datasets 112 | Dataset 1 — User 1 |
| | Dataset 2 — User 2 |
| | Dataset 3 — User 3 |
| | Dataset 4 — User 4 |
| | Dataset 5 — User 5 |
| Update Timestamps 114 | 2024-01-24T03:32 |
| | 2024-02-01T15:29 |
| | 2024-02-13T18:11 |
| Creation Time 116 | 2024-01-22T09:59 |

100

| Metadata | |
|---|---|
| Attribute<br>102a | Value<br>102b |
| Metadata Identifier<br>104 | 29349 |
| Data Type<br>106 | User Information |
| Region Identifier<br>108 | British Columbia, Canada |
| Log File Location<br>110 | Filepath A |
| Associated Datasets<br>112 | Dataset 1 — User 1 |
| | Dataset 2 — User 2 |
| | Dataset 3 — User 3 |
| | Dataset 4 — User 4 |
| | Dataset 5 — User 5 |
| Update Timestamps<br>114 | 2024-01-24T03:32 |
| | 2024-02-01T15:29 |
| | 2024-02-13T18:11 |
| Creation Time<br>116 | 2024-01-22T09:59 |

| Metadata Ruleset 1 | |
|---|---|
| Criterion 122a | Value 122b |
| Data Type 124 | User Information |
| Region Identifier 126 | Canada |
| Threshold Update Frequency 128 | Greater than | 3 updates per month |
| Threshold Creation Time 130 | 2024-01-24T00:00 |

| Action Execution Ruleset for Metadata Ruleset 1 | | |
|---|---|---|
| Action 142a | Condition 142b | |
| Retention 144 | Greater than | Quality Metric: 0.72 |
| Deletion 146 | Less than or Equal to | Quality Metric: 0.60 |
| Masking 148 | Between | Quality Metric: 0.61-0.71 |
| Process Records Independently 150 | All Data | |

SYSTEMS AND METHODS FOR DYNAMIC EVALUATION OF METADATA CONSISTENCY AND DATA RELIABILITY

BACKGROUND

As computer-generated data becomes more complex and integrated into a greater variety of technical applications, secure database handling has become more important. For example, data structures enable data organization, management, and storage in a manner that may be efficient. Databases may provide organized collections of data that enable data capture and analysis, as well as administrator controls over the associated data. Small databases may be stored on a file system, while large databases may be stored on computer clusters or cloud storage. Databases may be used to support operations internal to a computing system and may interface with external users. However, despite their flexibility and ease of access, databases may be susceptible to cybersecurity attacks, privacy breaches, or other associated vulnerabilities. As such, data is often subject to security-related controls, protocols, and data storage configuration requirements.

SUMMARY

Methods and systems are described herein for the dynamic evaluation of metadata consistency and data reliability for retention and deletion of secure data. For example, the methods and systems are described herein for evaluating computing system log files to determine whether to retain or delete such files in accordance with technical or security-based requirements that apply to the associated data and metadata therein. As such, the system enables efficient, reliable evaluation of data for data handling in secure systems, thereby mitigating the risk of data breaches or other adverse security outcomes and enabling efficient data storage by enabling automated, safe data deletion, retention, and remediation.

In pre-existing data management systems associated with sensitive data, data may be evaluated on a periodic basis for deletion, where such data may be evaluated manually or by algorithms that do not consider the nature of the evaluated data. For example, in pre-existing systems, log files associated with the operation of sensitive computing systems, such as high-performance computing (HPC) clusters, may be deleted at a pre-determined periodicity (e.g., every 30 days, every 180 days, or yearly). However, such systems do not account for differences in the nature of the stored data, such as differences in security requirements for log files associated with different partitions of the HPC cluster. For example, such systems cannot account for differences in security, storage location, or other aspects of the nature of the data. As such, such systems may handle complex data ineffectively, thereby requiring manual review of data to render data deletion or retention decisions. Such a manual review may cause inconsistencies and inefficiencies in the handling of data, leading to the unnecessary retention of data in some cases.

Automating the handling of data may be challenging in situations where metadata quality is inconsistent or heterogeneous. For example, different types of data (e.g., different types of logs) associated with different subsystems may include differing metadata formats, completed fields, or data structures. For some datasets, metadata may be missing or incomplete. As an illustrative example, metadata associated with a first log file associated with a more secure partition of an HPC cluster may include additional security certificates that are not included in the metadata associated with a second log file associated with an open-access partition of the HPC cluster. As such, automated evaluation of data for retention or deletion may not capture differences in metadata quality or completion between different types of data. Furthermore, in some situations, even if metadata quality is acceptable or uniform, the associated data may be broken, invalid, non-uniform, or insecure. For example, a log file may include missing entries or missing time periods, which may be stored in different files or different systems. Due to technical or policy restrictions, some data or metadata of a data management system may only be partially readable, thereby increasing the complexity of data handling. As such, different data may have different handling criteria or rules associated with data retention or deletion. Pre-existing data management systems do not have a method to ensure that such data is evaluated or fixed prior to handling, leading to potentially incomplete or inaccurate data retention or deletion.

To overcome these technical deficiencies in automating data retention and deletion in data management systems with heterogeneous metadata evaluation requirements, the methods and systems disclosed herein enable generation of consistency metrics that indicate whether metadata is consistent with a metadata ruleset specifying how to handle the associated data. For example, the system may determine whether to process the records within the metadata in batch or independently based on comparing the metadata consistency metric with a threshold metric, in order to determine whether to retain or delete the associated data based on the quality or attributes of the associated metadata. As an illustrative example, the system may receive metadata associated with retained data of a data management system. Based on this metadata, the system may retrieve a metadata ruleset indicating criteria associated with further retaining the data associated with the metadata. The system may generate a consistency metric associated with consistency of the metadata with the metadata ruleset. For example, the metadata ruleset may include criteria for the metadata that indicates that the records within the metadata are to be analyzed independently, rather than as a batch, due to security protocols. Based on comparing the consistency metric with a threshold metric, the system may determine to process each record of the metadata in bulk or as a batch, thereby enabling accurate, flexible, and automated data retention and deletion decisions. For example, certain types of data (e.g., associated with particular subsystems of an HPC cluster) may require or benefit from deletion, retention, or modification of data in batch, while other types of data may require or benefit from record-by-record processing of this data. In some implementations, the system may notify an administrator system of incomplete or broken metadata and/or generate patches for such metadata, thereby enabling reliable evaluation of secure data associated with a data management system. As such, the methods and systems disclosed herein enable reliable evaluation of data to improve data retention and deletion, while maintaining adherence to relevant security or privacy rules or protocols associated with different data types or metadata quality metrics. By doing so, the system may dynamically evaluate metadata to detect data eligible for deletion in a manner consistent with the data's characteristics, thereby improving the efficiency of system resource use by enabling prompt deletion of eligible data.

In some aspects, the system may retrieve first metadata. The system may retrieve second metadata. The system may retrieve a metadata ruleset. The system may generate a first metadata consistency metric indicating a first measure of consistency of the first metadata with the metadata ruleset. In response to determining that the first metadata consistency metric is greater than a threshold consistency metric, the system may determine to process each record of the first metadata as a batch. The system may generate a second metadata consistency metric indicating a second measure of consistency of the second metadata with the metadata ruleset. In response to determining that the second metadata consistency metric is not greater than the threshold consistency metric, the system may determine to process each record of the second metadata independently.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows an illustrative schematic of metadata associated with retained data, in accordance with one or more embodiments.

FIG. 1B shows an illustrative schematic of a metadata ruleset associated with retained data, in accordance with one or more embodiments.

FIG. 1C shows an illustrative schematic of an action execution ruleset associated with the metadata ruleset of FIG. 1B, in accordance with one or more embodiments.

DETAILED DESCRIPTION

Figure 2A:
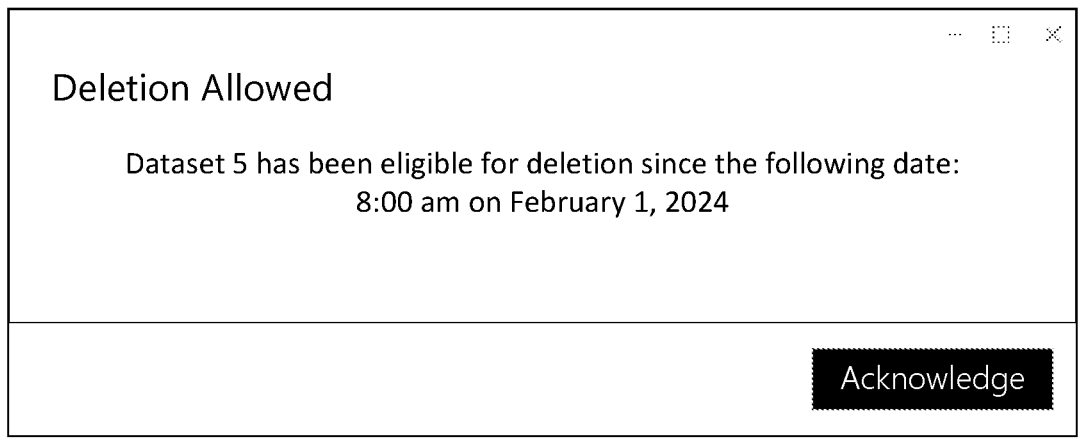
FIG. 2A shows an illustrative schematic of a deletion or retention message associated with data deletion or retention eligibility, in accordance with one or more embodiments.
Figure 2A:
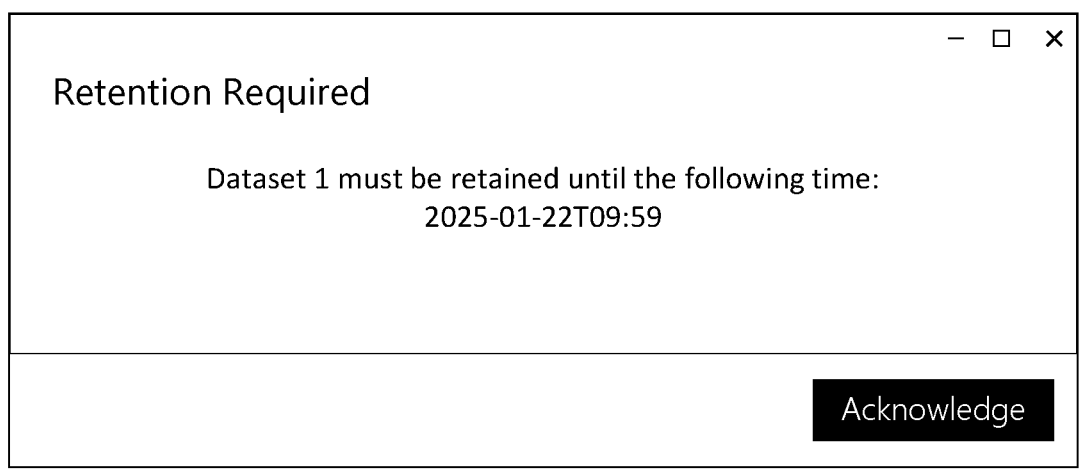

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows an illustrative schematic 100 of metadata associated with retained data, in accordance with one or more embodiments. For example, schematic 100 may include a data structure that includes metadata associated with data retained within a data management system, where the metadata includes attributes 102a and corresponding values 102b. For example, the data structure corresponding to the metadata may store attributes including metadata identifier 104, data type 106, region identifier 108, log file location 110, associated datasets 112, update timestamps 114, and/or creation time 116. By storing information associated with given data in the form of metadata, the data management system provides an efficient way to characterize and evaluate retained data in order to execute data deletion or retention actions without analyzing the underlying data, thereby improving the efficiency of the data management system.

The metadata may be associated with data retained within a data management system. A data management system may include a system that enables the input, storage, evaluation, analysis, and/or patching of data. For example, a data management system may include a file system or a data processing environment associated with an HPC cluster. The data management system may store data (e.g., retained data) and/or associated metadata. A data management system may include a user account management system (e.g., associated with user account information, such as a bank account, a credit card account, or a financial product account). The data management system may include a system associated with a single device or computing system. The data management system can communicate with client devices, user terminals, or other computing devices (e.g., through one or more suitable network interfaces). In some embodiments, the data management system may include a distributed system (e.g., a cloud system and/or a system where data and operations are distributed across multiple devices or systems). For example, a data management system includes a server system associated with storage of data (e.g., retained data).

Retained data may include data for processing within an HPC cluster, or personal information associated with users of a bank account, such as user identifiers (e.g., names, Social Security numbers, or other suitable identifiers), locations (e.g., addresses), account identifiers (e.g., bank account information), communication information (e.g., transaction information), or other suitable data. The data may include information that is associated with one or more geographical regions, classifications, or other entities. For example, data may include personal identifiable information (PII) associated with a particular country, state, or jurisdiction. As such, different data stored within the data management system may exhibit different data processing protocols, rules, or policies.

For example, data stored within the data management system may include retained data. Retained data may include information that is retained due to retention criteria, such as data management system-related protocols, policies, regulatory requirements, or other data controls. For example, retained data may include sensitive information with security-related storage requirements. For example, the data management system may determine that certain retained data is to be deleted (e.g., overwritten or moved to another file system) within a given time frame (e.g., within 1 month, 2 months, 6 months, or 1 year from receipt of this information). In some embodiments, the retained data may include information formatted as files (e.g., data files), data within partitions of the data management system, datasets, or data rows. Data may be associated with attributes (e.g., property values or characteristics of the data), indications of which may be stored within associated metadata. In some implementations, data may include one or more records (e.g., portions of data). To illustrate, a record may include a row of a dataset or table (e.g., as corresponding to a particular user account of a user account database). In some implementations, a record includes a collection of data within the data management system (e.g., as corresponding to a particular attribute, such as a time range, a geographic region, or another classification).

The data may be associated with metadata. For example, metadata may include information characterizing a portion or an entirety of a piece of data (e.g., a set of records, retained data, or a dataset). For example, metadata may be stored within the data management system, and may be associated with attributes, such as an identifier (e.g., metadata identifier 104), including an alphanumeric, numeric, or textual identifier of the metadata and/or the associated data. In some implementations, the metadata may include an attribute corresponding to a data type for the associated retained data (e.g., for the associated records), such as an indication that the data pertains to "User Information," as shown in FIG. 1A. The metadata may include an identifier of a geographical region (e.g., region identifier 108 shown in FIG. 1A). The metadata may include a locator or other indicator of an associated dataset, such as log file location 110. For example, the indicator of the associated dataset can include a uniform resource locator (URL) for a location of a log file or another file associated with the corresponding data, or an associated file path. In some implementations, the metadata includes datasets (e.g., files, data records, or identifiers of data rows or columns) for which the metadata applies, as illustrated in FIG. 1A as associated datasets 112. For example, associated datasets 112 can include an identifier of a dataset (e.g., a set of financial transactions) and an indication of a corresponding user identifier. In some implementations, the metadata includes information associated with updates to the data, such as corresponding timestamps (e.g., update timestamps 114). The metadata may include a creation time for the associated retained data (e.g., creation time 116). By including such information associated with a given dataset or collection of data of the data management system, the system disclosed herein enables efficient data handling decisions (e.g., for data retention, deletion, or remediation) based on characteristics of the corresponding data.

In some implementations, the metadata may include a data class (e.g., a data type). A data class may include a descriptor, identifier, or indicator of a type, classification, or categorization, associated data, data records, and/or metadata (e.g., associated retained data). For example, a data class may include data type 106, thereby indicating that the metadata is associated with "User Information," as illustrated in FIG. 1A. In some implementations, a data class may include an indication of a security or privacy requirement, such as an indication (e.g., a binary indicator) of a security level, a privacy level, or whether the associated data includes PII. In some implementations, each record associated with a dataset may include a data class. For example, each record (e.g., row) of a dataset may include a user account associated with a different geographical location; the data class may indicate a classification of these geographical locations. As such, the system may determine which records and/or data correspond to a given data class. By classifying data, data records, and/or metadata according to a data class, the data management system enables evaluation of processing protocols for the data (e.g., to determine data retention, deletion, or other actions to execute).

In some implementations, the system may determine an update frequency associated with the retained data. For example, the system may determine an average rate at which retained data associated with given metadata is updated based on information relating to when such updates occur. As an illustrative example, the system may use update timestamps 114 to determine an average number of updates that occur in a given amount of time (e.g., updates per unit time). By doing so, the system may determine information relating to the recency of updates, as well as whether the retained data is being actively used, modified, or supplemented. As such, the update frequency enables the system to evaluate the nature of data to determine whether such data is eligible or liable for deletion or retention on the basis of the recency of this data. For example, the system may compare the update frequency with a threshold update frequency associated with a metadata ruleset to determine how to process the data, as discussed in relation to FIG. 1B.

FIG. 1B shows an illustrative schematic of a metadata ruleset associated with retained data, in accordance with one or more embodiments. For example, FIG. 1B includes data structure 120 storing a metadata ruleset that includes retention or deletion criteria for retaining data associated with a data management system. For example, data structure 120 includes a metadata ruleset that includes criteria 122a and associated values 122b. Data structure 120 may include criteria including data type 124, region identifier 126, threshold update frequency 128, or threshold creation time 130. By generating, determining, storing, receiving, or processing metadata rulesets, the system enables evaluation of metadata for classification and handling of data (e.g., data retained within a data management system).

For example, the metadata ruleset (e.g., data structure 120) may include criteria (e.g., particular attributes associated with the ruleset), where the criteria include conditions that indicate consistency of metadata with the given metadata ruleset. For example, a criterion of a metadata ruleset may include an indication of a data type (e.g., data type 124). A data type may include an indication of a type of data associated with the particular metadata ruleset; for example, a given metadata ruleset may correspond to data of a "User Information" type, while another metadata ruleset may correspond to data of a "Computational Performance" type. In some implementations, a metadata ruleset may be associated with one or more data types. For example, different data types may be associated with different data processing protocols (e.g., different retention times). As such, by including information relating to a data type, the system enables classification of datasets (e.g., via the corresponding metadata) by the type of data within.

In some implementations, the metadata ruleset (e.g., data structure 120) may include a criterion associated with a particular region identifier (e.g., region identifier). For example, data structure 120 may include an indication of a political entity (e.g., a country, a state, a district, a county, a postal code, or another suitable subdivision), a geographical region (e.g., a continent, a cultural area, a nation, a landmass, a marine area, or any other physical location), or another location-based indication. In some implementations, the system may store the region identifier as a data structure indicating a list or range of coordinates associated with the metadata ruleset. For example, the region identifier may include a structured list including entities (e.g., postal codes or country codes) associated with the metadata ruleset and associated criteria. By including region identifiers as criteria within the metadata ruleset, the system enables evaluation and classification of metadata (and, therefore, associated retained data) on the basis of geographical region. For example, some data may be associated with different handling requirements (e.g., different retention or deletion criteria) based on a location associated with the data. As such, the metadata ruleset confers improved flexibility for accurate, efficient data handling decisions by the data management system.

In some implementations, the metadata ruleset includes a threshold update frequency (e.g., threshold update frequency 128 within FIG. 1B). A threshold update frequency may include an indication of a limit of an update frequency associated with classifying data according to the corresponding metadata. For example, the system may compare an update frequency attribute of metadata associated with particular data retained within the data management system with the threshold update frequency to determine whether the update frequency is greater than, equal to, or less than the threshold update frequency. The metadata ruleset may include an indication of which of these conditions (e.g., "greater than," "equal to," or "less than") are consistent with the result of the comparison. Based on this indication, the system may determine whether the particular data is consistent with the given metadata ruleset. To illustrate, the system may determine that a dataset is partially consistent with data structure 120 corresponding to the metadata ruleset, based on determining that the associated metadata includes an update frequency that is greater than the indicated threshold update frequency (e.g., threshold update frequency 128). As such, the system may determine a consistency metric associated with the retention criteria, thereby enabling the system to evaluate whether this dataset satisfies the criteria in order to determine to execute further operations (e.g., associated with storing, retaining, masking, or deleting the data).

In some implementations, the metadata ruleset includes a criterion corresponding to threshold creation time (e.g., threshold creation time 130). A threshold creation time may include an indication of a time limit associated with classifying data according to the corresponding metadata. For example, the system may compare a timestamp associated with the dataset (e.g., a creation timestamp within the associated metadata corresponding to a time at which the associated data is created) with the threshold creation time of a particular metadata ruleset to determine whether the timestamp is later, earlier, or contemporaneous with the threshold creation time. The metadata ruleset may include an indication of which of these conditions (e.g., "later than," "earlier than," or "contemporaneous with") are consistent with the result of the comparison. Based on this indication, the system may determine whether the particular data is consistent with the given metadata ruleset. To illustrate, the system may determine a consistency metric associated with the retention criteria, thereby enabling the system to evaluate whether the dataset satisfies the retention criteria in order to determine to execute further operations (e.g., associated with storing, retaining, masking, or deleting the data), as determined by the schematic 140 corresponding to the action execution ruleset, corresponding to Metadata Ruleset 1, as shown in FIG. 1C.

The system may determine, based on the metadata ruleset and metadata associated with retained data of the data management system, a metadata consistency metric. The metadata consistency metric may indicate a measure of consistency of the metadata with the metadata ruleset. For example, the metadata consistency metric may indicate a fraction of the criteria of the metadata ruleset that the metadata satisfies. As an illustrative example, the data structure 120 of FIG. 1B, corresponding to Metadata Ruleset 1, may include four criteria (e.g., corresponding to data type 124, region identifier 126, threshold update frequency 128, and threshold creation time 130). The system may determine whether metadata of the data management system satisfies each of these four criteria. Based on these determinations, the system may determine a fraction of the metadata criteria satisfied by the metadata (e.g., corresponding to a consistency percentage).

Additionally or alternatively, the metadata consistency metric may include an indication of a percentage of a dataset associated with a given data class. For example, the metadata consistency metric may include a proportion of records of a given dataset that correspond to an indicated data class (e.g., a data class corresponding to a region identifier, such as region identifier 126). The system may determine which records of the given dataset are associated with the indicated data class and, as such, determine a percentage of the records of the dataset that are associated with the data class and, therefore, are consistent with the metadata ruleset. The system may store this percentage as the metadata consistency metric. By determining a metadata consistency metric associated with a dataset (e.g., by evaluating the associated metadata), the system enables evaluation of whether a given dataset is consistent with a given metadata ruleset. Based on this evaluation, the system may determine to execute an action (e.g., deletion, retention, masking, or another action), thereby enabling automated, efficient, and accurate handling of secure data within the data management system.

FIG. 1C shows illustrative schematic 140 of an action execution ruleset associated with the metadata ruleset of FIG. 1B, in accordance with one or more embodiments. For example, the system may determine an action (e.g., including retention, deletion, masking, or tokenization, such as any of actions 142*a*) on the basis of satisfaction of one or more conditions (e.g., conditions 142*b*). Conditions 142*b* may include, a retention condition corresponding to retention action 144, a deletion condition corresponding to deletion action 146, and/or a masking condition corresponding to masking action 148. For example, the system may calculate one or more quality metrics associated with data and determine an action based on these quality metrics. In some implementations, a given action execution ruleset may specify an action for all data that is consistent with the associated metadata ruleset. For example, the action execution ruleset may include processing instructions 150 (e.g., instructions to process all data associated with the Metadata Ruleset 1 independently, i.e., record-by-record), as described below.

The system may calculate a quality metric for metadata or data stored in the data management system. For example, the system may determine a quality metric including a measure of the quality (e.g., accuracy, precision, or consistency) of data and/or metadata associated with the data management system. A quality metric may include an indication of whether records of a dataset match known records (e.g., of a different dataset), and/or may include an average quality metric associated with the components of given data. As an illustrative example, the quality metric may include a determination as to the quality associated with the respective metadata (e.g., as determined by a validation model and an associated data validation metric, as described below).

For example, a match indicator may include an indication of a match between one or more records of a dataset and a corresponding record (e.g., a "ground-truth" record, such as one stored on a server system). For example, a match indicator includes an indication that account information associated with a record of the dataset is consistent with account information for the same account on a separate (e.g., third-party) user account database. In some implementations, determining the match indicator may include processing the dataset as a whole (e.g., comparing the dataset with a stored dataset in the third-party database). Additionally or alternatively, determining the match indicator may include processing the dataset independently (e.g., record-by-record, i.e., comparing each record of the dataset with the corresponding record of the stored dataset). As such, the system may determine the accuracy or quality of the data by determining the accuracy and/or consistency of the data. In some implementations, the system may determine the match indicator with respect to the metadata rather than the data, thereby enabling evaluation of the metadata quality.

In some implementations, the system may determine a record-by-record quality metric (e.g., a quality metric for each record of given data or metadata). For example, the system may determine whether records of the data or metadata match known or stored records that correspond to the same information (e.g., the same user or the same user account). For example, the system may determine a match fraction associated with a proportion of a dataset record that matches a known record of a third-party database and store the match fraction as the quality metric for the corresponding record. The system may determine an average quality metric (e.g., an average match fraction) associated with a plurality of records within a dataset and determine how to process the data according to this average quality metric.

In some implementations, the system may provide the data (and/or the metadata) to a data validation model to determine a quality metric (e.g., a validation metric) associated with the data (and/or metadata). For example, a data validation model may include a process, an algorithm, a machine learning model (e.g., an artificial neural network), or an engine for validating, evaluating, or processing data. A data validation model may include a test model, such as a model that enables processing the data to generate an output and evaluating whether the output matches an expected output. In some implementations, a data validation model may generate a validation metric based on this match. For example, the data validation model may determine a fractional match between the expected output and the actual output and store this value as the validation metric. In some implementations, the data validation model may execute this analysis record-by-record and generate an average fractional match (e.g., across all the records of the dataset or metadata) and determine the validation metric according to the average fractional match. By evaluating the data or metadata associated with the data management system, the system may determine how to handle such data (e.g., whether to remediate the data, retain the data, or delete the data) based on the quality of the data, thereby improving the accuracy and efficiency of data management.

For example, in some implementations, the system may determine to retain, delete, or execute an action associated with data or metadata based on a comparison between the quality metric (e.g., the validation metric) and a threshold quality metric (e.g., a threshold validation metric). For example, the system may determine conditions 142b associated with actions 142a and determine a subset of these conditions fulfilled by the associated metadata and/or data. As an illustrative example, the system may determine to retain data based on determining that the quality metric (or average quality metric) associated with retained data is greater than a particular threshold quality metric (e.g., as shown in FIG. 1C, a retention condition corresponding to retention action 144). When the quality metric or validation metric is less than the threshold metric, the system may generate an error message relating to one or more errors associated with validating the associated data or metadata (e.g., as described in relation to FIG. 2B). As such, the system may determine to retain data of a high quality, and may determine to take another action (e.g., delete, mask, or warn an administrator) regarding data that does not match the threshold quality metric. By doing so, the system enables improved security, flexibility, and accuracy associated with the data management system's data handling decisions.

In some implementations, the system may determine to process data or metadata in batch or independently, thereby executing actions accordingly. For example, the system may determine to retain a dataset in its entirety based on an analysis of the quality of the associated data and/or metadata. In some implementations, the system may evaluate the quality of the data within the dataset as a whole (e.g., by processing the whole dataset using a data validation model). Additionally or alternatively, the system may evaluate the quality of the data of individual records within the dataset (e.g., by determining an accuracy or a consistency of records of the dataset). In some implementations, the system may determine to delete or retain the whole dataset (and/or the associated metadata). Additionally or alternatively, the system may determine to delete or retain records of the dataset (and/or associated metadata) based on a record-by-record evaluation of the data.

In some implementations, retention of data includes storage of data (and/or associated metadata) for a determinate or an indeterminate amount of time. For example, data retention may include storing data for a determined amount of time (e.g., as determined by the action execution ruleset for the associated metadata). The system may determine to store this data within an existing location within the data management system. Additionally or alternatively, the system may move the given data to be retained to a partition, a server, or a file system associated with retained data. In some implementations, the system may determine to retain the records of the dataset independently (e.g., record-by-record). For example, the system may determine rows of a dataset to be retained and may determine to delete other rows (or store these other rows in a different location). In some implementations, for particular types of data (e.g., where the metadata ruleset corresponds to enterprise-type data), the corresponding action execution ruleset may indicate retention of data based on historic parameters, including usage and/or dataset age (e.g., based on a creation timestamp of the associated metadata). As such, the system may flexibly process (e.g., execute actions upon) data within the data management system according to the metadata ruleset (e.g., as shown in data structure 120 of FIG. 1B) and associated action execution ruleset (e.g., as shown in schematic 140 of FIG. 1C).

In some implementations, deletion of data includes the removal of data or metadata. For example, the data deletion may include overwriting memory or storage associated with the given data and/or moving the data to a system, storage medium, or entity that is indicated for deletion (e.g., after a threshold elapsed time, such as 30 days, 6 months, or 1 year). As an illustrative example, the system may determine that, according to an action execution ruleset associated with the metadata ruleset, a given dataset is to be deleted as it has been retained for greater than a threshold period of time (e.g., beyond a threshold creation time). In some implementations, the system may determine to delete individual records of the associated data or metadata (e.g., record-byrecord). For example, the system may determine to delete particular rows (e.g., associated with particular users) of a given dataset, according to rules associated with an action execution ruleset that is associated with a metadata ruleset matching the given dataset. As such, the system enables flexible, accurate, and responsible data handling on the basis of protocols, security requirements, or privacy controls associated with the data management system.

FIG. 2A shows an illustrative schematic of a deletion or retention message associated with data deletion or retention eligibility, in accordance with one or more embodiments. For example, the system may generate deletion message 200 (e.g., for display on a user interface on an administrator device for the data management system) relating to whether deletion is allowed (including any additional information relating to the data's eligibility for deletion and/or suitable information relating to the data). For example, the system may generate a message identifying a dataset that is eligible for deletion, as well as a timestamp from which the data is eligible for deletion (e.g., a deletion message). In some implementations, the system may generate retention message 220 (e.g., for display on a user interface on an administrator device for the data management system) relating to whether retention is allowed and/or required according to the associated metadata ruleset and/or action execution ruleset. For example, the system may generate a message identifying a dataset that is to be retained, as well as a timestamp until which the data must be retained within the data management system (e.g., a retention message). By generating a message associated with information eligible for retention or deletion, the system enables system administrator devices to control, manage, and supervise data handling operations, thereby improving the security and error mitigation capabilities of the data management system.

In some implementations, the system may determine to mask data (and/or metadata) associated with the data management system. For example, the system may replace a dataset with a data structure of the same format, but with records replaced with incomprehensible information (e.g., randomly generated alphanumeric characters). In some implementations, the system may determine to mask particular columns across the entire dataset, specific columns in specific rows, and/or particular characters/character patterns within a column for a specific row (e.g., mask columns in a rule-based manner). In some implementations, the system may determine to mask particular rows of the dataset (e.g., record-by-record) by processing the data independently in a record-wise manner (e.g., according to an associated action execution ruleset that corresponds to a metadata ruleset determined to be consistent with the data or associated metadata). By doing so, the system may replace or hide sensitive data prior to further retention or transmission to other entities, thereby improving the security, safety, and flexibility of the data management system.

In some implementations, the system may determine to tokenize data (and/or metadata) associated with the data management system. For example, the system may replace information within a dataset or metadata with tokens (e.g., non-sensitive data). The system may, for example, encrypt the dataset as a whole (or columns thereof) and store this encrypted version (e.g., in order to retain the data) according to rules of an associated action execution ruleset. In some implementations, the system may generate tokens for sensitive information (e.g., private information, based on privacy rules associated with a corresponding metadata ruleset) independently on a record-by-record basis. For example, the system may generate non-sensitive tokens associated with the data on a record-by-record basis (e.g., on a row-by-row basis). By generating non-sensitive (e.g., unreadable) representations of the data within the dataset, the system may retain information relating to the dataset while maintaining any required privacy or security controls (e.g., according to a location, retention time, or other information associated with the data, as determined through the corresponding metadata ruleset). As such, the system improves its ability to responsibly, accurately, flexibly, and securely manage data associated with the data management system.

Figure 2B:
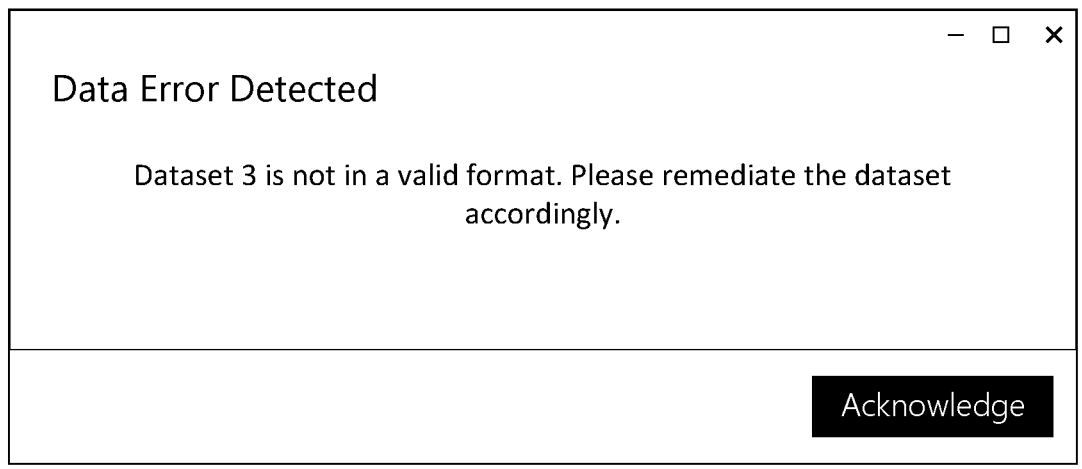
FIG. 2B shows an illustrative schematic of an error message associated with data quality, in accordance with one or more embodiments.

FIG. 2B shows an illustrative schematic of error message 240 associated with data quality, in accordance with one or more embodiments. For example, the error message may include an indication of an evaluation of whether the data format associated with the dataset is consistent with an expected data format. In some implementations, the error message includes an indication of a result from the data validation model (e.g., relating to whether the validation model's output matches an expected output). As an illustrative example, the system may determine a first data format associated with the data associated with the metadata. The system may determine whether the first data format is consistent with a data format associated with input requirements for the data validation model. In some implementations, the system may determine that the first data format is inconsistent with the input requirements based on an error or error message associated with the data validation model. As such, the system enables dynamic evaluation of data quality prior to data handling (e.g., data retention, tokenization, masking, or deletion), thereby improving the accuracy, efficiency, and flexibility of the system for handling data of varying quality and types.

Figure 3:
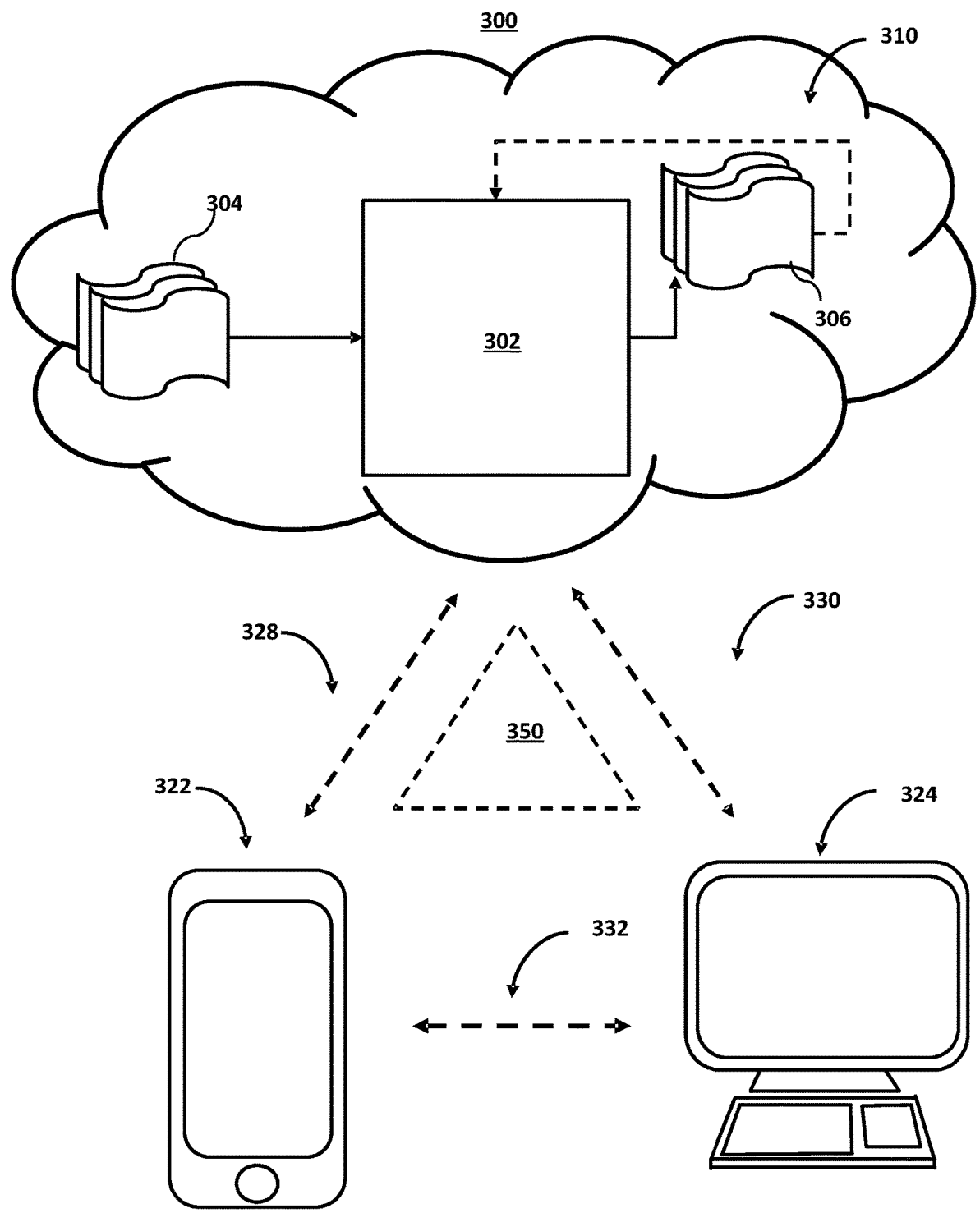
FIG. 3 shows illustrative components for a system used to evaluate metadata consistency and data reliability for dynamic evaluation of data retention and deletion criteria, in accordance with one or more embodiments.

FIG. 3 shows illustrative components for a system used to evaluate metadata consistency and data reliability for dynamic evaluation of data retention and deletion criteria, in accordance with one or more embodiments. For example, FIG. 3 may show illustrative components for evaluating metadata associated with data (e.g., bank or credit account information associated with banking/credit users of a data management system) to determine data retention, deletion, masking, or tokenization decisions according to relevant security policies, protocols, and regulations. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include databases (e.g., user account databases or metadata databases associated with a data management system), third-party data sources (e.g., third-party databases), servers, virtual machines, user terminals (e.g., Point-of-Sale terminals) or other such computing systems. For example, cloud components 310 may include or communicate with user devices and/or computing systems external to the cloud components or data management system.

Cloud components 310 may access information associated with a data management system, such as data (e.g., including datasets, columns, rows, structured data, unstructured data, or other suitable information), metadata, metadata rulesets, processing rulesets (e.g., action execution rulesets), or other suitable data structures.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a quality metric or data validation metric associated with metadata or corresponding data).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether given data or metadata is consistent with a metadata ruleset and/or a determination to process a given dataset through retention, deletion, masking, and/or tokenization).

In some embodiments, the model (e.g., model 302) may automatically perform actions based on outputs 306. In some embodiments, the model (e.g., model 302) may not perform any actions. The output of the model (e.g., model 302) may be used to retain, delete, mask, or tokenize data on the basis of evaluation of the corresponding metadata.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
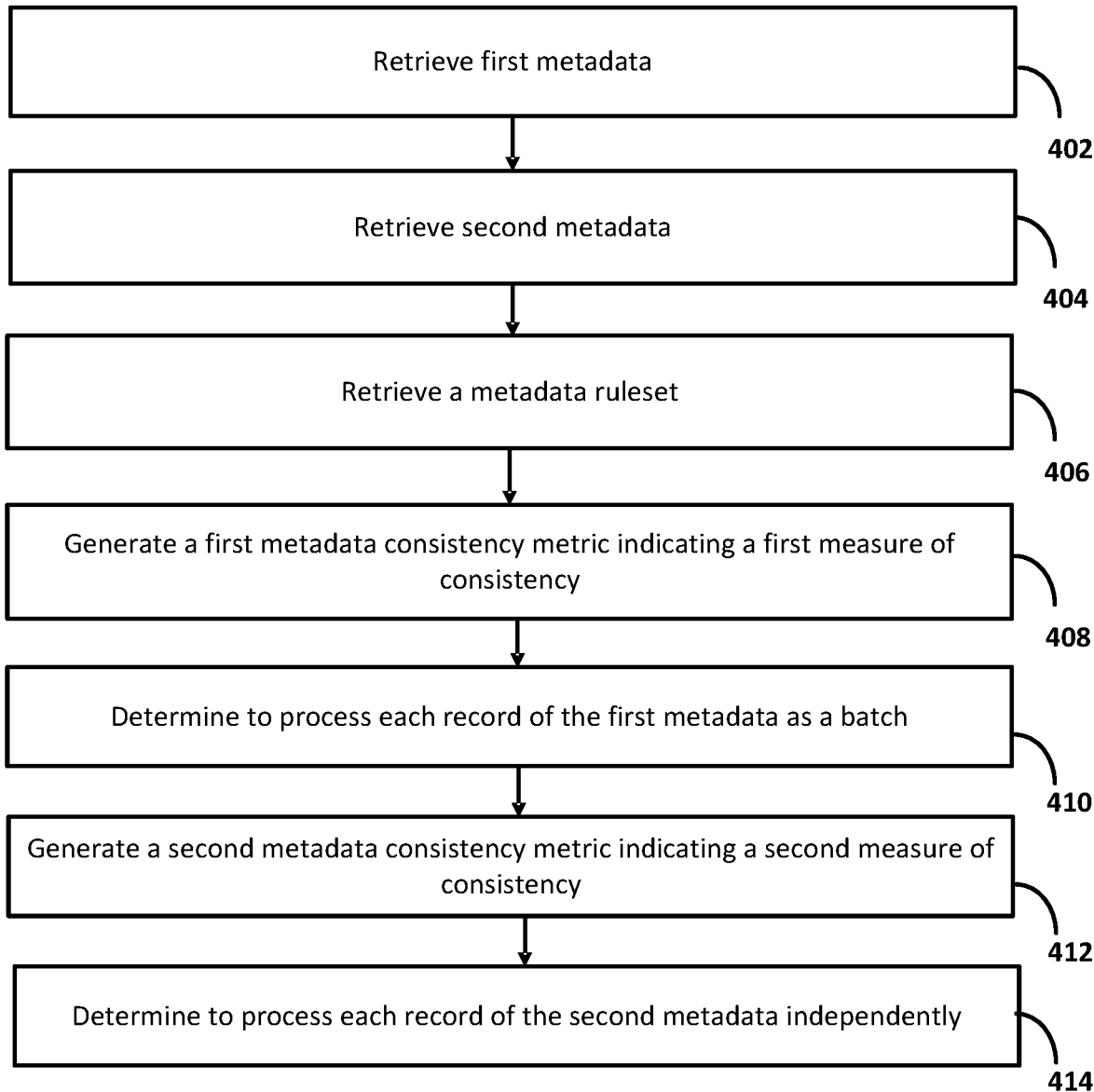
FIG. 4 shows a flowchart of the steps involved in dynamically evaluating metadata and/or data to improve the efficiency and accuracy of data retention or deletion, in accordance with one or more embodiments.

FIG. 4 shows a flowchart of the steps involved in dynamically evaluating metadata and/or data to improve the efficiency and accuracy of data retention or deletion, in accordance with one or more embodiments. For example, the system may use process 400 (e.g., as implemented on one or more system components described above) in order to evaluate user account information (e.g., for bank or credit accounts) for satisfaction and compliance with security controls, protocols, and regulations, in a flexible, automated, and secure manner.

At step 402, process 400 (e.g., using one or more components described above) enables the system to retrieve first metadata. For example, the system may retrieve first metadata for a first set of retained data in a data management system. As an illustrative example, the system may retrieve information relating to a record of a user account database (e.g., associated with a banking or credit system). The metadata may include information relating to the geographical location of one or more records of the associated dataset (e.g., a country, jurisdiction, or another suitable indication). In some implementations, the metadata may include information relating to the time at which the dataset (or entries/records thereof) are created or updated, as well as information relating to the type of data stored within the system (e.g., PII or protected health information). As such, the system may receive information relating to the nature of data stored within the data management system to enable data-specific handling of such data (e.g., retention, deletion, masking, or tokenization), such as based on geography-specific retention rules (e.g., associated with Canadian privacy regulations).

At step 404, process 400 (e.g., using one or more components described above) enables the system to retrieve second metadata. For example, the system may retrieve second metadata for a second set of retained data in the data management system. As an illustrative example, the system may retrieve similar metadata for another dataset or from another data storage system. The metadata may include information of different types, creation times, or geographical regions. As such, the system enables handling of different types of information (e.g., associated with residents of different countries). As such, the system enables flexible, dynamic handling of data that may be subject to different regulatory or privacy controls.

At step 406, process 400 (e.g., using one or more components described above) enables the system to retrieve a metadata ruleset (e.g., for retention criteria). As an illustrative example, the system may retrieve information associated with how to process and/or evaluate data of the data management system on the basis of the associated metadata. For example, the system may receive an identifier of criteria where such criteria, when consistent with given metadata, indicates a set of protocols for evaluation of the associated data (e.g., an action execution ruleset). For example, the metadata ruleset may indicate a geographical region associated with the dataset (or records thereof) that indicate a particular set of processing rules. The geographical region may indicate a country (e.g., Canada) with a specified set of data handling regulations for PII or protected health information. The system may store such metadata in a system associated with data handling regulations. Additionally or alternatively, the system may periodically request updated metadata rulesets (e.g., to monitor changes in data processing requirements or controls over time) thereby enabling dynamic evaluation of data over time.

At step 408, process 400, (e.g., using one or more components described above) enables the system to generate a metadata consistency metric. For example, the system may generate a first metadata consistency metric indicating a first measure of consistency of the first metadata with the metadata ruleset. As an illustrative example, the system may determine an indication that the retrieved metadata ruleset matches attributes of the metadata associated with the data management system. To illustrate, the system may determine that the metadata ruleset indicates a particular class or set of restrictions associated with the given data—for example, the system may determine that the metadata indicates that the associated data includes PII associated with a Canadian resident. Based on this determination, the system may calculate a metadata consistency metric accordingly (e.g., with a relatively high value, indicating a likely match between the metadata and the metadata ruleset). Accordingly, the system may determine to process such information in a different manner (e.g., record-by-record, as discussed below), improving the flexibility of the data management system to handle data in a targeted, data-specific manner.

In some embodiments, the system may generate a metadata consistency metric based on evaluating the consistency of records of the metadata (and/or the associated data) with data classes of the metadata ruleset. For example, the system may identify, within the metadata ruleset, an indication of a first data class, where the first data class indicates a first categorization of metadata records. The system may determine a plurality of records from the first metadata. The system may determine a plurality of data classes associated with the plurality of records, where each data class of the plurality of data classes is associated with a particular record of the plurality of records, and where each data class indicates a categorization of the particular record of the first metadata. The system may determine a consistency percentage where the consistency percentage indicates, from the plurality of data classes, a proportion of data classes associated with the first data class. The system may generate the first metadata consistency metric based on the consistency percentage. As an illustrative example, the system may determine the metadata consistency metrics based on determining a percentage of records within the metadata (and/or data) that are consistent with the metadata ruleset. A metadata ruleset may indicate that, for consistency with the ruleset, a given dataset is associated with personal information from a particular jurisdiction (e.g., Canada). The system may determine a fraction of records of the given dataset (and/or metadata) that are associated with this jurisdiction and determine the consistency percentage according to this fraction. Based on this consistency percentage, the system may evaluate the relevance of a given set of metadata and/or underlying data with a given metadata ruleset for processing or evaluating this data. By doing so, the system may determine a suitable set of rules and/or actions to process or execute with respect to data of the data management system in a data-specific, flexible manner.

In some embodiments, the system may generate a metadata consistency metric based on whether attributes of the metadata match particular attributes (e.g., criteria) of the metadata ruleset. For example, the system may determine a first attribute of the first metadata, where the first attribute indicates a characteristic of a set of retained data associated with the first metadata. The system may determine a particular attribute associated with the metadata ruleset. The system may determine that the first attribute matches the particular attribute. Based on determining that the first attribute matches the particular attribute, the system may generate the first metadata consistency metric. As an illustrative example, the system may determine whether attributes of the metadata ruleset (e.g., criteria relating to geographical region) match attributes of the metadata associated with the data (e.g., a region identifier associated with a user or a set of data of the data management system). By doing so, the system may evaluate data for particular attributes, characteristics, or regions for determination of how to process such data, improving the security, efficiency, and flexibility of the associated data management system in storing, deleting, and/or masking data.

In some embodiments, the system may determine whether a location associated with the metadata matches a geographical region associated with the metadata ruleset. For example, the system may determine that the first attribute includes an indication of a location corresponding to a user associated with the first metadata. The system may determine that the particular attribute includes an indication of a geographical region. The system may determine that the location is associated with the geographical region. Based on determining that the location is associated with the geographical region, the system may determine that the first attribute matches the particular attribute. As an illustrative example, the system may determine a location associated with the data and/or records associated with the data, such as by determining a location indicator associated with the metadata. Based on this location, the system may determine whether a metadata ruleset is consistent (e.g., includes a region identifier associated with this location). To illustrate, metadata associated with the data management system may include an indication of a city within Canada. A metadata ruleset may include an indication that data associated with Canada is consistent with the metadata (e.g., a region identifier). The system may determine that the location is associated with or consistent with the region identifier and, based on this determination, generate an associated metadata consistency metric that indicates this geographical match. As such, the system may monitor and flexibly manage data associated with different geographical regions and/or jurisdictions, thereby enabling jurisdiction-specific data processing according to any associated data privacy regulations or suitable security controls.

In some embodiments, the system may generate the metadata consistency metric based on evaluating an update frequency associated with the metadata. For example, the system may determine, based on the first metadata, an update frequency, where the update frequency indicates a temporal frequency for modification of a set of retained data associated with the first metadata. The system may compare the update frequency with a threshold update frequency of the metadata ruleset. Based on comparing the update frequency with the threshold update frequency of the metadata ruleset, the system may generate the first metadata consistency metric. As an illustrative example, the system may determine an update frequency associated with data of the data management system. For example, the system may retrieve timestamps associated with updates to user account information (e.g., banking or other financial information) stored within the data management system within a particular dataset—the metadata associated with this dataset may include such timestamps (e.g., including an indication of records that have been modified and the time at which they were modified). Based on this information, the system may generate an average update rate associated with the dataset, thereby providing information relating to the recency of associated records (and/or the level of activity associated with the dataset). The system may compare the update rate with a threshold update rate associated with a metadata ruleset to determine a matching level with the dataset. As an illustrative example, the metadata ruleset may indicate that datasets that have or have not been updated within a threshold amount of time (and/or are updated, on average, below or above a threshold number of times per unit time), are associated with a particular set of data evaluation protocols (e.g., as defined by an action execution ruleset). For example, the system may include different requirements for retention, deletion, masking, and/or tokenization (or other suitable actions) depending on a frequency or recency of updates to a given dataset. As such, the system enables improved data handling decision-making on the basis of temporal information associated with suitable datasets.

In some embodiments, the system may determine the threshold frequency based on the metadata ruleset. For example, the system may determine a first attribute of the first metadata. The system may determine a particular threshold frequency corresponding to the first attribute. The system may generate the threshold update frequency based on the particular threshold frequency. As an illustrative example, the system may extract the threshold frequency from an attribute associated with the metadata ruleset (e.g., within a corresponding data structure). As such, the threshold frequency may differ with respect to different handling rules, thereby enabling targeted, flexible, and modular handling of data on the basis of such temporal information.

At step 410, process 400 (e.g., using one or more components described above) enables the system to process each record of the first metadata as a batch. For example, in response to determining that the first metadata consistency metric is greater than a threshold consistency metric, the system may determine to process each record of the first metadata as a batch. As an illustrative example, the system may determine that the given data satisfies (e.g., is consistent with) a given metadata ruleset (e.g., as associated with United States PII or PHI) based on comparing the first metadata consistency metric with a threshold consistency metric. By doing so, the system enables determination of handling procedures or protocols on the basis of similarity between a given dataset and the associated handling protocols. As such, the system may process sensitive user information (e.g., financial or personal information associated with a user and an associated bank account) in a manner that is consistent with any privacy controls, security regulations, or other requirements.

In some embodiments, the system may determine to retain and/or delete (or execute a suitable action with respect to) data based on generating a quality metric for the metadata and/or associated data. For example, the system may identify a first set of retained data corresponding to the first metadata. Based on determining to process each record of the first metadata as the batch, the system may generate a first quality metric corresponding to the entirety of the first metadata. Based on the first quality metric, the system may determine whether to retain the first set of retained data. As an illustrative example, the system may evaluate data associated with users of bank accounts (or other information that may be sensitive or private). For example, the system may generate a metric associated with the quality of the metadata and/or the data. In some implementations, criteria and/or protocols for determining the quality metric may differ with respect to the metadata ruleset determined to be consistent with the given data or metadata. For example, the system may determine that the data is associated with United States PII or protected health information. Based on this determination, the system may extract an algorithm or protocol for evaluating the data (e.g., such that this data is evaluated in a batch-type fashion) and determine an associated quality metric associated with the data. By doing so, the system may further determine to execute actions with respect to the data, such as retention or deletion, on the basis of data-specific processing protocols, thereby improving the flexibility, efficiency, and security of the system that is sensitive to required security or privacy protocols.

In some embodiments, the system may generate the quality metric based on a match indicator. For example, the system may transmit, to a data management system, a query for metadata matching the first metadata. The system may obtain, in response to the query and from the data management system, stored metadata matching the first metadata. The system may compare the first metadata and the stored metadata. Based on comparing the first metadata and the stored metadata, the system may generate a match indicator indicating consistency between the first metadata and the stored metadata. Based on the match indicator, the system may generate the first quality metric. As an illustrative example, the system may determine whether metadata associated with the data (e.g., a given dataset) match currently stored data within a third-party database that matches the given dataset. In some implementations, the system may determine whether a user profile (e.g., an account identifier) associated with the metadata (e.g., as relating to banking information) is consistent with a stored account identifier within an account database associated with the data management system. The system may determine a quality metric as a percentage or fraction (e.g., a measure) of consistency between the metadata and the stored metadata. By doing so, the system may verify the accuracy of information associated with the data management system dynamically, thereby enabling the system to take corrective action (e.g., remediation) if needed.

At step 412, process 400 (e.g., using one or more components described above) enables the system to generate a second metadata consistency metric. For example, the system may generate a second metadata consistency metric indicating a second measure of consistency of the second metadata with the metadata ruleset. As an illustrative example, the system may generate a consistency metric associated with the second data (e.g., a second dataset). The system may determine an extent to which the second dataset is associated with Canadian user information and, as such, may evaluate the suitability of using associated criteria (e.g., an action execution ruleset) for determining data handling decisions. As such, the system enables evaluation of data associated with different types of data to handle multiple data types and any associated data processing protocols or regulations.

At step 414, process 400 (e.g., using one or more components described above) enables the system to determine to process each record of the second metadata independently. For example, in response to determining that the second metadata consistency metric is not greater than the threshold consistency metric, the system may determine to process each record of the second metadata independently. As an illustrative example, the system may determine that, based on determining that the data corresponds to Canadian user information, the system may process records of the second metadata independently (e.g., by evaluating each row of a data table associated with the metadata) for determination of how to retain the associated data. In some implementations, the system may determine to retain particular records of the metadata and/or associated data based on this record-by-record evaluation of the data. For example, the system may determine a quality metric associated with each record of the data and determine to delete records below a particular threshold quality metric. By doing so, the system may improve the flexibility and accuracy of data retained within the system, while retaining the ability of the system to process data according to any suitable data regulations or protocols that are consistent with the associated metadata.

In some embodiments, the system may determine quality metrics on a record-by-record basis for determination of actions to be executed with respect to a given dataset. For example, the system may identify a second set of retained data corresponding to the second metadata. Based on determining to process each record of the second metadata independently, the system may generate a respective quality metric for each record of the second metadata. Based on the respective quality metrics, the system may determine whether to retain the second set of retained data. As an illustrative example, the system may determine whether to retain data based on an evaluation of individual records of the metadata (and/or the data itself). In some cases, the system may, for example, determine to mask or tokenize independent records of the metadata and/or the data itself based on determining that these records correspond to a particular metadata ruleset (e.g., based on determining that these records are associated with Canadian user information). As such, the system enables different processing protocols for data within a data management system according to the nature of the associated metadata, conferring flexibility and security to the data stored within the system.

In some embodiments, the system may determine match indicators based on comparing records with known records (e.g., as stored on another system or database). For example, the system may transmit, to a data management system, a query for records matching a particular record of the second metadata. The system may obtain, in response to the query and from the data management system, a stored record matching the particular record. The system may compare the particular record and the stored record. Based on comparing the particular record and the stored record, the system may generate a corresponding match indicator indicating consistency between the particular record and the stored record. Based on the corresponding match indicator, the system may generate the respective quality metric. As an illustrative example, the system may determine whether individual records associated with metadata (e.g., corresponding to particular users of a financial system) match records that are known to be true (e.g., a ground-truth). For example, the system may compare a record of the metadata or associated data with a record stored within a user account database (e.g., corresponding to bank accounts). By doing so, the system may evaluate the quality of data to be retained, deleted, and/or suitably processed, thereby improving the accuracy and efficiency of data remediation and evaluation.

In some embodiments, the system may determine a quality metric based on processing a dataset in a record-by-record manner. For example, the system may determine a second set of retained data based on the second metadata. The system may process each record of the second metadata independently to generate a plurality of quality metrics, where each quality metric of the plurality of quality metrics indicates a measure of quality for a corresponding record of the second metadata. The system may determine an average quality metric, wherein the average quality metric indicates a mean measure of quality of the second metadata. The system may determine whether to retain the second set of retained data based on the average quality metric. As an illustrative example, the system may determine quality metrics for particular records within the metadata and/or the dataset. For example, the system may determine whether individual rows (e.g., corresponding to bank account information for different users) are valid or accurate (e.g., by validating the format of this data, and/or comparing with data stored within another database, such as a third-party database) and determine a quality metric for each such record accordingly. The system may determine an average quality metric for the dataset as a whole, in order to enable further evaluation of how to process the dataset. By doing so, the system may evaluate datasets record-by-record for retention, deletion, masking, and/or tokenization decisions in a manner that is consistent with any relevant regulations, security controls, or privacy concerns, thereby improving the security, accuracy, and flexibility of the system to manage multiple types of sensitive data.

In some embodiments, the system may generate a data validation metric associated with data in order to determine to execute an action with respect to the data. For example, the system may identify a first set of retained data corresponding to the first metadata. The system may retrieve, from a data management system, the first set of retained data. The system may provide the first set of retained data to a data validation model to generate a data validation metric for the first set of retained data. The system may compare the data validation metric with a threshold validation metric. Based on determining that the data validation metric is greater than the threshold validation metric, the system may determine to retain the first set of retained data. As an illustrative example, the system may determine whether data associated with the dataset is valid by processing the data using a data validation model. The data validation model may include an algorithm for checking the validity, performance, or accuracy of the data associated with the dataset. As an illustrative example, the data validation model may include processing the dataset according to an established process (e.g., a user validation process for validation of a user's bank details or financial information). The system may compare the result of the output (e.g., a predicted validation status of users' bank details) with an expected output (e.g., the actual validation status of the bank details) to determine a validation metric for the data. Based on the value of this validation metric, the system may determine to execute an action (e.g., remediate, mask, or send a validation error message indicating an error in validation). As such, the system enables dynamic data accuracy validation in a manner that enables flexible, data-specific processing requirements (e.g., by enabling record-by-record data validation or batch validation).

In some embodiments, the system may transmit an error message when the data validation metric is less than a threshold value. For example, based on determining that the data validation metric is less than the threshold validation metric, the system may generate an error message, wherein the error message indicates a data format error. The system may transmit the error message to the data management system. As an illustrative example, the system may determine that the data validation metric, associated with validating bank account information associated with users of a bank account management system, is less than (e.g., or equal to) a threshold validation metric. Based on this determination, the system may determine to delete and/or transmit a message to an administrator system (or another suitable entity) to flag a potential error. For example, the system may determine that the data validation model output for a given dataset includes a data format error message; based on this determination, the system may generate a message (e.g., for display on an administrator system) indicating the data formatting error. As such, the system enables prompt, efficient, and accurate fixes to any issues associated with data quality.

In some embodiments, the system may determine to execute an action with respect to data based on comparing the metadata with retention criteria (e.g., an action execution ruleset). For example, the system may determine, based on the metadata ruleset, a retention criterion. The system may determine that the first metadata satisfies the retention criterion. The system may determine a first set of retained data corresponding to the first metadata. Based on determining that the first metadata satisfies the retention criterion, the system may determine to retain the first set of retained data. As an illustrative example, the system may determine an action execution ruleset that is associated with a particular metadata ruleset of a set of metadata rulesets. For example, the metadata ruleset may indicate that the data of the dataset is associated with Canadian PII; based on this determination, the system may determine a set of retention criteria (e.g., action execution rules) that pertain to Canadian PII as well. The retention criteria may include criteria associated with the quality of the data (e.g., based on a record-by-record evaluation of the data's accuracy, in line with any action execution rules defined by the action execution ruleset). As such, the system may determine whether to retain the associated data on the basis of retention criteria. In some implementations, the system may determine, based on the retention criteria, to tokenize or mask portions of (or the entire) dataset according to any associated rules of the action execution ruleset. By doing so, the system enables dynamic evaluation of data and associated metadata to determine data processing protocols according to the nature of the data and to improve the flexibility, modularity, and efficiency of data management within a data management system.

In some embodiments, the system may generate a deletion message based on a determination to delete the retained data. For example, the system may determine, in a data management system, a second set of retained data associated with the second metadata. Based on processing each record of the second metadata independently, the system may determine to delete the second set of retained data. Based on determining to retain the second set of retained data, the system may transmit a deletion message to the data management system, wherein the deletion message comprises an indication of the second set of retained data. As an illustrative example, the system may determine, based on deletion criteria (e.g., according to criteria within an action execution ruleset), to delete and/or transmit a message regarding deletion of the dataset. In some implementations, the system may generate instructions and/or suggestions to delete particular portions of the dataset, such as particular records associated with a set of users (e.g., users of bank accounts with Canadian residency or association with another particular jurisdiction or region). Alternatively or additionally, the system may determine to delete the entire dataset and associated metadata in batch, thereby processing the dataset in batch. In some implementations, the deletion message may include a time at which the dataset is to be deleted (e.g., according to any suitable security or privacy controls). As such, the system enables retention or deletion of datasets on the basis of information within the associated metadata, thereby enabling different processing protocols according to the type of data being processed. By doing so, the system enables improved security and efficiency in data handling decisions.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising retrieving first metadata for a first set of retained data in a data management system; retrieving second metadata for a second set of retained data in the data management system; retrieving a metadata ruleset for retention criteria; generating a first metadata consistency metric indicating a first measure of consistency of the first metadata with the metadata ruleset; in response to determining that the first metadata consistency metric is greater than a threshold consistency metric, determining to process each record of the first metadata as a batch, wherein processing each record of the first metadata as the batch comprises generating a first quality metric corresponding to the entirety of the first metadata; determining whether to retain the first set of retained data based on the first quality metric; generating a second metadata consistency metric indicating a second measure of consistency of the second metadata with the metadata ruleset; in response to determining that the second metadata consistency metric is not greater than the threshold consistency metric, determining to process each record of the second metadata independently, wherein processing each record of the second metadata independently comprises generating a respective quality metric for each record of the second metadata; and determining whether to retain the second set of retained data based on respective quality metrics for each record.

2. A method, the method comprising retrieving first metadata; retrieving second metadata; retrieving a metadata ruleset; generating a first metadata consistency metric indicating a first measure of consistency of the first metadata with the metadata ruleset; in response to determining that the first metadata consistency metric is greater than a threshold consistency metric, determining to process each record of the first metadata as a batch; generating a second metadata consistency metric indicating a second measure of consistency of the second metadata with the metadata ruleset; and in response to determining that the second metadata consistency metric is not greater than the threshold consistency metric, determining to process each record of the second metadata independently.

3. A method, the method comprising retrieving first metadata for a first set of retained data; retrieving second metadata for a second set of retained data; retrieving a metadata ruleset; generating a first metadata consistency metric indicating a first measure of consistency of the first metadata with the metadata ruleset; in response to determining that the first metadata consistency metric is greater than a threshold consistency metric, processing each record of the first metadata as a batch; based on processing each record of the first metadata as a batch, determining whether to retain the first set of retained data; generating a second metadata consistency metric indicating a second measure of consistency of the second metadata with the metadata ruleset; in response to determining that the second metadata consistency metric is not greater than the threshold consistency metric, processing each record of the second metadata independently; and based on processing each record of the second metadata independently, determining whether to retain the second set of retained data.

4. The method of any one of the preceding embodiments, wherein generating the first metadata consistency metric comprises identifying, within the metadata ruleset, an indication of a first data class, wherein the first data class indicates a first categorization of metadata records; determining a plurality of records from the first metadata; determining a plurality of data classes associated with the plurality of records, wherein each data class of the plurality of data classes is associated with a particular record of the plurality of records, and wherein each data class indicates a categorization of the particular record of the first metadata; determining a consistency percentage, wherein the consistency percentage indicates, from the plurality of data classes, a proportion of data classes associated with the first data class; and generating the first metadata consistency metric based on the consistency percentage.

5. The method of any one of the preceding embodiments, wherein generating the first metadata consistency metric comprises determining a first attribute of the first metadata, wherein the first attribute indicates a characteristic of a set of retained data associated with the first metadata; determining a particular attribute associated with the metadata ruleset; determining that the first attribute matches the particular attribute; and based on determining that the first attribute matches the particular attribute, generating the first metadata consistency metric.

6. The method of any one of the preceding embodiments, wherein determining that the first attribute matches the particular attribute comprises determining that the first attribute includes an indication of a location corresponding to a user associated with the first metadata; determining that the particular attribute includes an indication of a geographical region; determining that the location is associated with the geographical region; and based on determining that the location is associated with the geographical region, determining that the first attribute matches the particular attribute.

7. The method of any one of the preceding embodiments, wherein generating the first metadata consistency metric comprises determining, based on the first metadata, an update frequency, wherein the update frequency indicates a temporal frequency for modification of a set of retained data associated with the first metadata; comparing the update frequency with a threshold update frequency of the metadata ruleset; and based on comparing the update frequency with the threshold update frequency of the metadata ruleset, generating the first metadata consistency metric.

8. The method of any one of the preceding embodiments, further comprising determining a first attribute of the first metadata; determining a particular threshold frequency corresponding to the first attribute; and generating the threshold update frequency based on the particular threshold frequency.

9. The method of any one of the preceding embodiments, further comprising identifying a first set of retained data corresponding to the first metadata; based on determining to process each record of the first metadata as the batch, generating a first quality metric corresponding to the entirety of the first metadata; and based on the first quality metric, determining whether to retain the first set of retained data.

10. The method of any one of the preceding embodiments, wherein generating the first quality metric comprises transmitting, to a data management system, a query for metadata matching the first metadata; obtaining, in response to the query and from the data management system, stored metadata matching the first metadata; comparing the first metadata and the stored metadata; based on comparing the first metadata and the stored metadata, generating a match indicator indicating consistency between the first metadata and the stored metadata; and based on the match indicator, generating the first quality metric.

11. The method of any one of the preceding embodiments, further comprising identifying a second set of retained data corresponding to the second metadata; based on determining to process each record of the second metadata independently, generating a respective quality metric for each record of the second metadata; and based on the respective quality metrics, determining whether to retain the second set of retained data.

12. The method of any one of the preceding embodiments, wherein generating the respective quality metric for each record of the second metadata comprises transmitting, to a data management system, a query for records matching a particular record of the second metadata; obtaining, in response to the query and from the data management system, a stored record matching the particular record; comparing the particular record and the stored record; based on comparing the particular record and the stored record, generating a corresponding match indicator indicating consistency between the particular record and the stored record; and based on the corresponding match indicator, generating the respective quality metric.

13. The method of any one of the preceding embodiments, further comprising determining a second set of retained data based on the second metadata; processing each record of the second metadata independently to generate a plurality of quality metrics, wherein each quality metric of the plurality of quality metrics indicates a measure of quality for a corresponding record of the second metadata; determining an average quality metric, wherein the average quality metric indicates a mean measure of quality of the second metadata; and determining whether to retain the second set of retained data based on the average quality metric.

14. The method of any one of the preceding embodiments, further comprising identifying a first set of retained data corresponding to the first metadata; retrieving, from a data management system, the first set of retained data; providing the first set of retained data to a data validation model to generate a data validation metric for the first set of retained data; comparing the data validation metric with a threshold validation metric; and based on determining that the data validation metric is greater than the threshold validation metric, determining to retain the first set of retained data.

15. The method of any one of the preceding embodiments, further comprising: based on determining that the data validation metric is less than the threshold validation metric, generating an error message, wherein the error message indicates a data format error; and transmitting the error message to the data management system.

16. The method of any one of the preceding embodiments, further comprising: determining, based on the metadata ruleset, a retention criterion; determining that the first metadata satisfies the retention criterion; determining a first set of retained data corresponding to the first metadata; and based on determining that the first metadata satisfies the retention criterion, determining to retain the first set of retained data.

17. The method of any one of the preceding embodiments, further comprising: determining, in a data management system, a second set of retained data associated with the second metadata; based on processing each record of the second metadata independently, determining to delete the second set of retained data; and based on determining to retain the second set of retained data, transmitting a deletion message to the data management system, wherein the deletion message comprises an indication of the second set of retained data.

18. One or more tangible, non-transitory, computer-readable media storing instructions that, when executed by a data processing apparatus, cause the data processing apparatus to perform operations comprising those of any of embodiments 1-17.

19. A system comprising one or more processors, and memory storing instructions that, when executed by the processors, cause the processors to effectuate operations comprising those of any of embodiments 1-17.

20. A system comprising means for performing any of embodiments 1-17.

What is claimed is:

1. A system for efficiently minimizing excess data retention in data management systems while reducing computer resource utilization involved in data retention decisions involving security protocols using dynamic evaluation of metadata consistency and data quality, the system comprising:
    one or more processors; and
    one or more non-transitory, computer-readable media storing instructions that, when executed by the one or more processors, cause operations comprising:
        retrieving, via a database associated with a data management system, (i) first metadata associated with a first set of retained data and (ii) second metadata associated with a second set of retained data, wherein the first set of retained data comprises a first set of records and the second set of retained data comprises a second set of records;
        retrieving a metadata ruleset indicating retention criteria to retain data;
        generating (i) a first metadata consistency metric indicating a first measure of consistency of the first metadata with the metadata ruleset and (ii) a second metadata consistency metric indicating a second measure of consistency of the second metadata with the metadata ruleset;
        in response to determining that the first metadata consistency metric is greater than a threshold consistency metric, determining to process each record of the first set of records as a batch in lieu of processing each record of the first set of records independently, wherein determining to process each record of the first set of records as the batch comprises generating a first quality metric corresponding to an entirety of the first metadata;
        retaining the first set of retained data based on the first quality metric satisfying a threshold quality metric to adhere to security protocols associated with the first set of retained data;
        in response to determining that the second metadata consistency metric is not greater than the threshold consistency metric, determining to process each record of the second set of records independently in lieu of processing each record of the second set of records as a batch, wherein determining to process each record of the second set of records independently comprises generating a respective quality metric for each record of the second set of records; and
        retaining records of the second set of records of the second set of retained data based on respective quality metrics for of the second set of records satisfying the threshold quality metric to adhere to security protocols associated with the second set of retained data.

2. A method for efficiently minimizing excess data retention in data management systems while reducing computer resource utilization involved in data retention decisions involving security protocols using dynamic evaluation of metadata consistency and data quality, the method comprising:
    retrieving, via a database, first metadata and second metadata;
    retrieving a metadata ruleset;
    generating (i) a first metadata consistency metric indicating a first measure of consistency of the first metadata with the metadata ruleset and (ii) a second metadata consistency metric indicating a second measure of consistency of the second metadata with the metadata ruleset;
    in response to determining that the first metadata consistency metric is greater than a threshold consistency metric, determining to process each record of the first metadata as a batch in lieu of processing each record of the first metadata independently, wherein it is determined that the first metadata consistency metric is greater than the threshold consistency metric;
    retaining a first set of retained data corresponding to the first metadata based on a first quality metric corresponding to an entirety of the first metadata satisfying a threshold quality metric to adhere to security protocols associated with the first set of retained data, wherein the first quality metric corresponding to the entirety of the first metadata satisfies the threshold quality metric;
    in response to determining that the second metadata consistency metric is not greater than the threshold consistency metric, determining to process each record of the second metadata independently in lieu of processing each record of the second metadata as a batch, wherein it is determined that the second metadata consistency metric is not greater than the threshold consistency metric; and retaining a second set of retained data corresponding to the second metadata based on respective quality metrics associated with records of the second metadata satisfying the threshold quality metric to adhere to security protocols associated with the second set of retained data, wherein the respective quality metrics satisfy the threshold quality metric.

3. The method of claim 2, wherein generating the first metadata consistency metric comprises:
identifying, within the metadata ruleset, an indication of a first data class, wherein the first data class indicates a first categorization of metadata records;
determining a plurality of records from the first metadata;
determining a plurality of data classes associated with the plurality of records, wherein each data class of the plurality of data classes is associated with a particular record of the plurality of records, and wherein each data class indicates a categorization of the particular record of the first metadata;
determining a consistency percentage, wherein the consistency percentage indicates, from the plurality of data classes, a proportion of data classes associated with the first data class; and
generating the first metadata consistency metric based on the consistency percentage.

4. The method of claim 2, wherein generating the first metadata consistency metric comprises:
determining a first attribute of the first metadata, wherein the first attribute indicates a characteristic of the first set of retained data associated with the first metadata;
determining a particular attribute associated with the metadata ruleset;
determining that the first attribute matches the particular attribute; and
based on determining that the first attribute matches the particular attribute, generating the first metadata consistency metric.

5. The method of claim 4, wherein determining that the first attribute matches the particular attribute comprises:
determining that the first attribute includes an indication of a location corresponding to a user associated with the first metadata;
determining that the particular attribute includes an indication of a geographical region;
determining that the location is associated with the geographical region; and
based on determining that the location is associated with the geographical region, determining that the first attribute matches the particular attribute.

6. The method of claim 2, wherein generating the first metadata consistency metric comprises:
determining, based on the first metadata, an update frequency, wherein the update frequency indicates a temporal frequency for modification of the first set of retained data associated with the first metadata;
comparing the update frequency with a threshold update frequency of the metadata ruleset; and
based on comparing the update frequency with the threshold update frequency of the metadata ruleset, generating the first metadata consistency metric.

7. The method of claim 6, further comprising:
determining a first attribute of the first metadata;
determining a particular threshold frequency corresponding to the first attribute; and
generating the threshold update frequency based on the particular threshold frequency.

8. The method of claim 2, further comprising:
identifying the first set of retained data corresponding to the first metadata;
based on determining to process each record of the first metadata as the batch, generating the first quality metric corresponding to the entirety of the first metadata; and
based on the first quality metric, determining whether to retain the first set of retained data.

9. The method of claim 8, wherein generating the first quality metric comprises:
transmitting, to a data management system, a query for metadata matching the first metadata;
obtaining, in response to the query and from the data management system, stored metadata matching the first metadata;
comparing the first metadata and the stored metadata;
based on comparing the first metadata and the stored metadata, generating a match indicator indicating consistency between the first metadata and the stored metadata; and
based on the match indicator, generating the first quality metric.

10. The method of claim 2, further comprising:
identifying the second set of retained data corresponding to the second metadata;
based on determining to process each record of the second metadata independently, generating a respective quality metric for each record of the second metadata; and
based on the respective quality metrics, determining whether to retain the second set of retained data.

11. The method of claim 10, wherein generating the respective quality metric for each record of the second metadata comprises:
transmitting, to a data management system, a query for records matching a particular record of the second metadata;
obtaining, in response to the query and from the data management system, a stored record matching the particular record;
comparing the particular record and the stored record;
based on comparing the particular record and the stored record, generating a corresponding match indicator indicating consistency between the particular record and the stored record; and
based on the corresponding match indicator, generating the respective quality metric.

12. The method of claim 2, further comprising:
determining the second set of retained data based on the second metadata;
processing each record of the second metadata independently to generate a plurality of respective quality metrics, wherein each respective quality metric of the plurality of respective quality metrics indicates a respective measure of quality associated with a corresponding record of the second metadata;
determining an average quality metric, wherein the average quality metric indicates a mean measure of quality of the second metadata; and
determining whether to retain the second set of retained data based on the average quality metric.

13. The method of claim 2, further comprising:
identifying the first set of retained data corresponding to the first metadata;
retrieving, from a data management system, the first set of retained data;

providing the first set of retained data to a data validation model to generate a data validation metric for the first set of retained data;
comparing the data validation metric with a threshold validation metric; and
determining to retain the first set of retained data based further on determining that the data validation metric is greater than the threshold validation metric.

14. The method of claim 13, further comprising:
based on determining that the data validation metric is less than the threshold validation metric, generating an error message, wherein the error message indicates a data format error; and
transmitting the error message to the data management system.

15. The method of claim 2, further comprising:
determining, based on the metadata ruleset, a retention criterion;
determining that the first metadata satisfies the retention criterion;
determining the first set of retained data corresponding to the first metadata; and
determining to retain the first set of retained data based further on determining that the first metadata satisfies the retention criterion.

16. The method of claim 2, further comprising:
determining, in a data management system, the second set of retained data associated with the second metadata;
determining to delete the second set of retained data based on a respective quality metric corresponding to a respective record of the second metadata failing to satisfy the threshold quality metric; and
transmitting a deletion message to the data management system, wherein the deletion message comprises an indication of the second set of retained data.

17. One or more non-transitory, computer-readable media storing instructions that, when executed by one or more processors, cause operations comprising:
retrieving, via a database, first metadata associated with a first set of retained data and second metadata associated with a second set of retained data;
retrieving a metadata ruleset;
generating (ii) a first metadata consistency metric indicating a first measure of consistency of the first metadata with the metadata ruleset and (ii) a second metadata consistency metric indicating a second measure of consistency of the second metadata with the metadata ruleset;
in response to determining that the first metadata consistency metric is greater than a threshold consistency metric, processing each record of the first metadata as a batch in lieu of processing each record of the first metadata independently;
retaining the first set of retained data associated with the first metadata based on a first quality metric corresponding to an entirety of the first metadata satisfying a threshold quality metric to adhere to security protocols associated with the first set of retained data;
in response to determining that the second metadata consistency metric is not greater than the threshold consistency metric, processing each record of the second metadata independently in lieu of processing each record of the second metadata as a batch; and
retaining the second set of retained data associated with the second metadata based on respective quality metrics associated with records of the second metadata satisfying the threshold quality metric to adhere to security protocols associated with the second set of retained data.

18. The one or more non-transitory, computer-readable media of claim 17, wherein the instructions for generating the first metadata consistency metric cause operations comprising:
identifying, within the metadata ruleset, an indication of a first data class, wherein the first data class indicates a first categorization of metadata records;
determining a plurality of records from the first metadata;
determining a plurality of data classes associated with the plurality of records, wherein each data class of the plurality of data classes is associated with a particular record of the plurality of records, and wherein each data class indicates a categorization of the particular record of the first metadata;
determining a consistency percentage, wherein the consistency percentage indicates, from the plurality of data classes, a proportion of data classes associated with the first data class; and
generating the first metadata consistency metric based on the consistency percentage.

19. The one or more non-transitory, computer-readable media of claim 17, wherein the instructions for generating the first metadata consistency metric cause operations comprising:
determining a first attribute of the first metadata, wherein the first attribute indicates a characteristic of the first set of retained data associated with the first metadata;
determining a particular attribute associated with the metadata ruleset;
determining that the first attribute matches the particular attribute; and
based on determining that the first attribute matches the particular attribute, generating the first metadata consistency metric.

20. The one or more non-transitory, computer-readable media of claim 19, wherein the instructions for determining that the first attribute matches the particular attribute cause operations comprising:
determining that the first attribute includes an indication of a location corresponding to a user associated with the first metadata;
determining that the particular attribute includes an indication of a geographical region;
determining that the location is associated with the geographical region; and
based on determining that the location is associated with the geographical region, determining that the first attribute matches the particular attribute.

* * * * *